(12) United States Patent
Dunstan

(10) Patent No.: US 8,684,636 B2
(45) Date of Patent: Apr. 1, 2014

(54) AIR SEEDER VENTING SYSTEM

(76) Inventor: James Dunstan, Victoria (AU)

(*) Notice: Subject to any disclaimer, the term of this patent is extended or adjusted under 35 U.S.C. 154(b) by 430 days.

(21) Appl. No.: 13/044,273

(22) Filed: Mar. 9, 2011

(65) Prior Publication Data
US 2012/0230779 A1 Sep. 13, 2012

(51) Int. Cl.
B65G 51/18 (2006.01)
(52) U.S. Cl.
USPC ........... 406/181; 406/171; 406/155; 406/157; 111/175; 137/561 A
(58) Field of Classification Search
USPC .................. 406/181, 171, 155, 157; 111/175; 137/561 A
See application file for complete search history.

(56) References Cited

U.S. PATENT DOCUMENTS

| 1,564,980 | A | * | 12/1925 | Singer | 406/48 |
|---|---|---|---|---|---|
| 4,040,444 | A | * | 8/1977 | Nolan | 137/561 A |
| 4,191,500 | A | * | 3/1980 | Oberg et al. | 406/146 |
| 4,463,583 | A | * | 8/1984 | Kruger et al. | 68/205 R |
| 4,549,567 | A | * | 10/1985 | Horton | 137/262 |
| 4,790,692 | A | * | 12/1988 | Bunyoz et al. | 406/181 |
| 4,807,663 | A | * | 2/1989 | Jones | 137/561 A |
| 4,913,597 | A | * | 4/1990 | Christianson et al. | 406/39 |
| 5,379,706 | A | * | 1/1995 | Gage et al. | 111/175 |
| 5,392,722 | A | * | 2/1995 | Snipes et al. | 111/174 |
| 5,630,680 | A | * | 5/1997 | Basak et al. | 406/155 |
| 7,264,423 | B2 | * | 9/2007 | Kowalchuk | 406/181 |
| 7,413,387 | B2 | | 8/2008 | Pleyer | 406/41 |
| 8,348,556 | B2 | * | 1/2013 | Hilgraf et al. | 406/123 |
| 8,505,574 | B2 | * | 8/2013 | Petersen et al. | 137/561 A |
| 8,544,498 | B2 | * | 10/2013 | Petersen et al. | 137/561 A |
| 2001/0016151 | A1 | * | 8/2001 | Poncelet et al. | 406/86 |
| 2012/0301231 | A1 | * | 11/2012 | Jagow et al. | 406/183 |
| 2012/0312211 | A1 | * | 12/2012 | Hubalek et al. | 111/175 |
| 2013/0136546 | A1 | * | 5/2013 | Friedmann | 406/181 |
| 2013/0247803 | A1 | * | 9/2013 | Heintzman | 111/176 |

* cited by examiner

Primary Examiner — Joseph Dillon, Jr.
(74) Attorney, Agent, or Firm — Swanson & Bratschun, L.L.C.

(57) ABSTRACT

An air seeder venting system comprising a filter screen mounted in a distribution head of an air seeder for separating seeds from air fed from a supply conduit, the distribution head having an inlet in communication with the supply conduit, a plurality of seed outlets in communication with seeding lines, and an air exhaust, wherein the filter screen is located so as to have at an upstream side the inlet and the plurality of seed outlets, and at a downstream side the air exhaust.

18 Claims, 4 Drawing Sheets

AIR SEEDER VENTING SYSTEM

TECHNICAL FIELD

This invention relates to an air seeder venting system, and more particularly, but not exclusively, to a venting system for an air seeder distribution head receiving upward flow of air carrying seeds and fertilizer.

BACKGROUND

It is known to provide an air seeder which may be towed by a vehicle such as, for example, a tractor. Typical air seeders deliver seed and fertilizer to outlets at an elevated air pressure provided by a fan. However, with the desire to plant seeds as quickly as possible, it has become apparent that with excessive elevated air pressures seeds may bounce against a ground surface so that the seeds do not rest in their intended position within a trench, and therefore may not germinate. In turn, the lack of germination of these displaced seeds results in lower yield and, in turn, lower profits.

In order to avoid seed bounce, it has been proposed to provide diffusers such as the kind marketed under the trade mark "D-Cup Diffuser". However, in using diffusers of this kind, individual diffusers are fitted to each seeding line or opener of the air seeder and, because there may be over 50 seeding lines on a single air seeder, the purchase of the required number of diffusers is typically very expensive. Moreover, with so many separate diffusers, significant maintenance is required in checking and maintaining proper operation of the diffusers.

Examples disclosed herein seek to provide an improved air seeder venting system.

SUMMARY

In accordance with one aspect of the present invention, there is provided an air seeder venting system comprising a filter screen mounted in a distribution head of an air seeder for separating seeds from air fed from a supply conduit, the distribution head having an inlet in communication with the supply conduit, a plurality of seed outlets in communication with seeding lines, and an air exhaust, wherein the filter screen is located so as to have at an upstream side the inlet and the plurality of seed outlets, and at a downstream side the air exhaust.

The filter screen may be adapted such that in use air from the inlet passes through the filter screen to the air exhaust, and seeds carried by the air are arrested by the filter screen and deflected by the filter screen to fall by gravity through the plurality of seed outlets.

A surface of the filter screen maybe at an oblique angle relative to a direction of air passing through the filter screen such that the seeds are encouraged away from a centre of the air passage. More preferably, the filter screen is conical, and is mounted in the distribution head to be tapered outwardly in the direction of air passage.

The filter screen may be made of mesh.

the air seeder venting system may include an adjustable valve downstream of the filter screen for adjusting airflow through the air exhaust. The valve may be a butterfly valve.

In some embodiments the exhaust may have a cap cover which moves outwardly from a tip of the exhaust to an open condition in response to airflow through the exhaust, and returns to a closed condition against the tip of the exhaust in the absence of airflow through the exhaust.

In some embodiments, the supply conduit feeds seed and fertilizer from an air seeder bin, at elevated air pressure, and the fertilizer carried by the air is arrested by the filter screen and deflected by the filter screen to fall by gravity through the plurality of seed outlets.

It may be desirable in some embodiments that air passes upwardly through the distributor head. For example, the air may pass substantially vertically through the distributor head.

The plurality of seed outlets may be spaced radially about the distributor head.

In accordance with another aspect of the present invention, there is provided a filter screen for an air seeder distribution head for separating seeds from air fed from a supply conduit to the air seeder distribution head, wherein the filter screen is conical.

In accordance with another aspect of the present invention, there is provided a method of fitting a venting system to an air seeder, including the steps of:

providing a distribution head of the air seeder with an air exhaust, and mounting a filter screen in the distribution head of the air seeder for separating seeds from air fed from a supply conduit, the filter screen being located so as to have at an upstream side an inlet of the distribution head in communication with the supply conduit and a plurality of seed outlets of the distribution head in communication with seeding lines, and at a downstream side the air exhaust of the distribution head, wherein the filter screen is adapted such that in use air from the inlet passes through the filter screen to the air exhaust, and seeds carried by the air are arrested by the filter screen and deflected by the filter screen to fall by gravity through the plurality of seed outlets.

BRIEF DESCRIPTION OF THE DRAWINGS

The invention is described, by way of non-limiting example only, with reference to the accompanying drawings in which:

FIG. 5 is a diagrammatic side perspective view of components of the air seeder venting system of FIG. 4, shown in isolation from the remainder of the air seeder distributor head.

DETAILED DESCRIPTION

Figure 1:
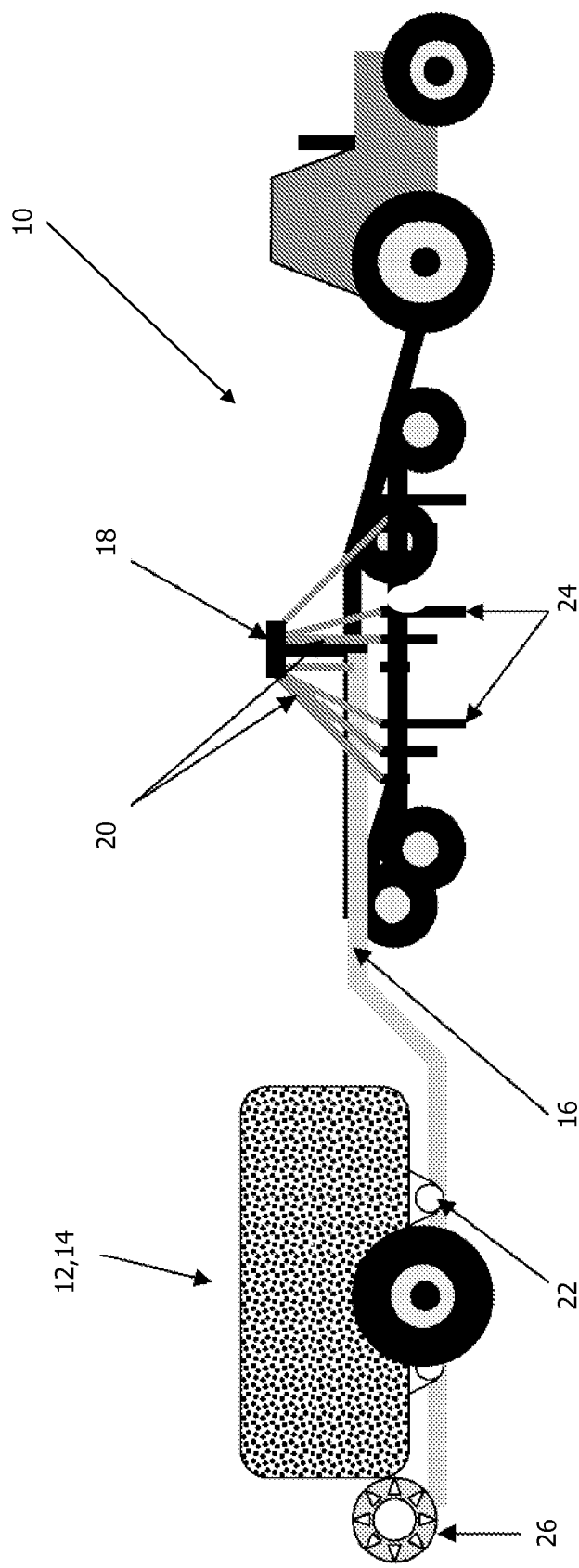
FIG. 1 is a diagrammatic side perspective view of a typical air seeder.
Figure 2:
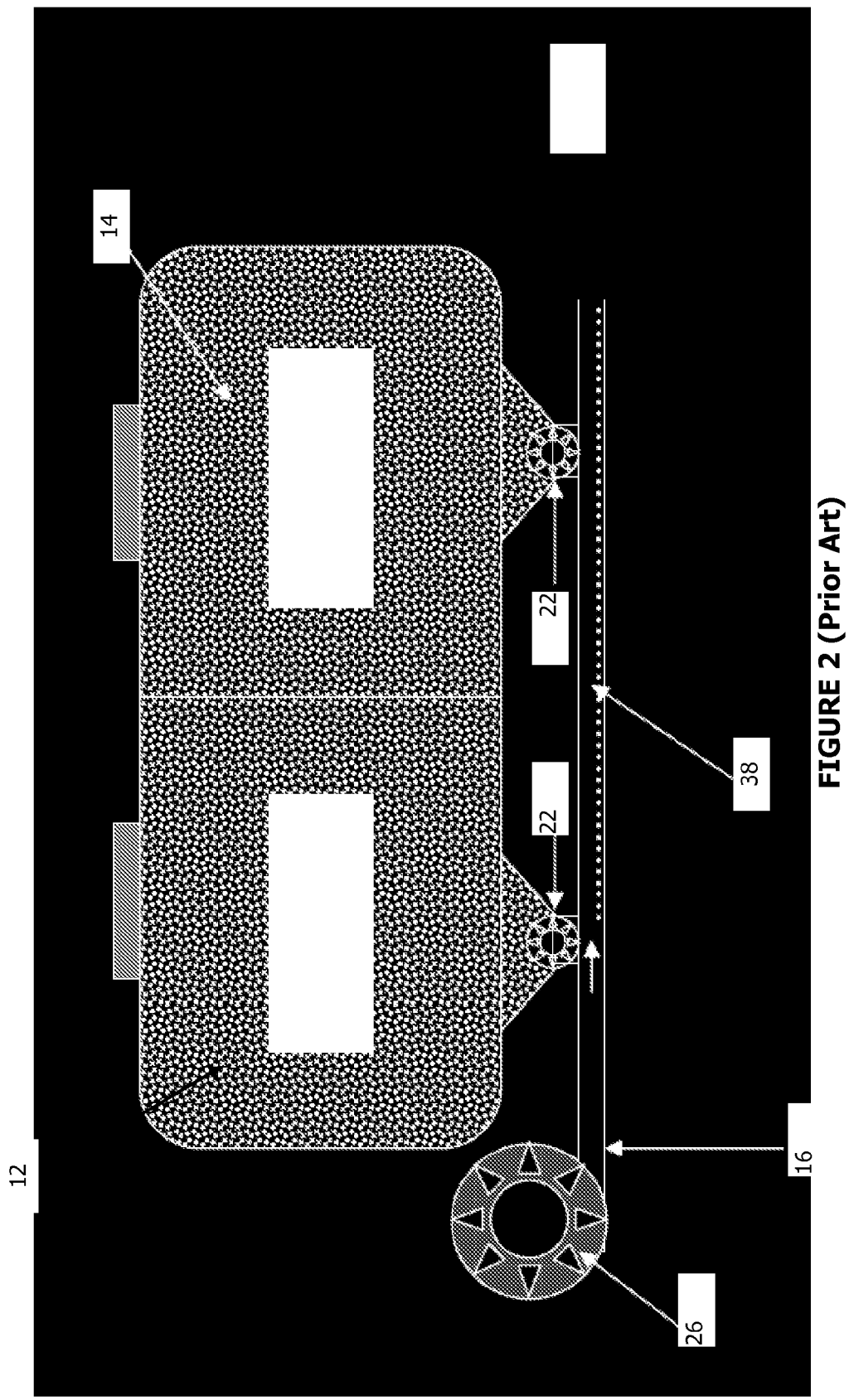
FIG. 2 is a diagrammatic side view of air seeder bins of a typical air seeder system.
Figure 3:
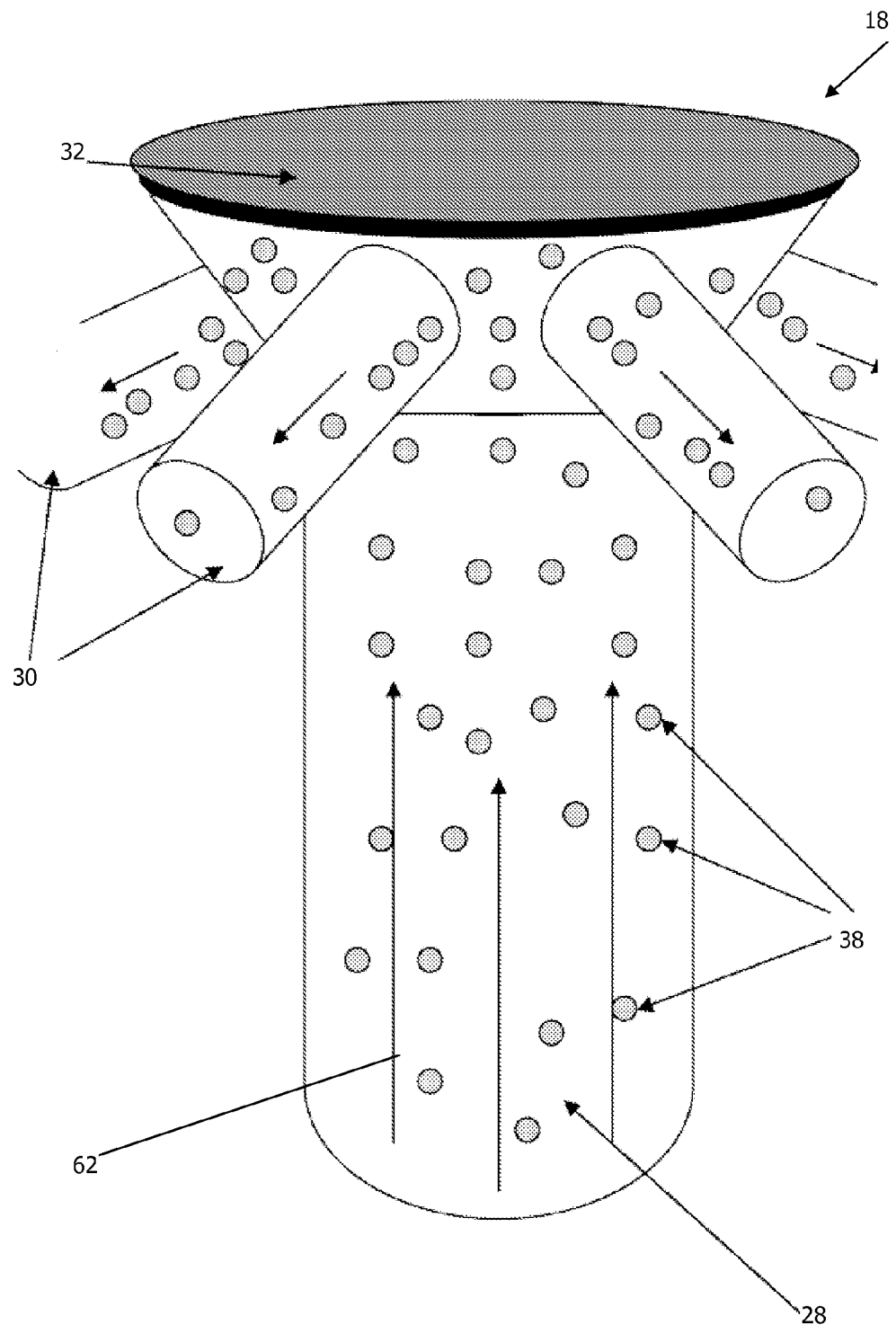
FIG. 3 is a side perspective view of a typical air seeder distributor head, shown partially transparent to depict flow of air, seed and fertilizer through the distributor head.

With reference to FIGS. 1 to 3 of the drawings, there is shown a typical air seeder 10 which includes seed and fertilizer bins 12, 14, and a supply conduit 16 for transferring seed/fertilizer from the bins 12, 14 to an air seeder head 18 via which the seed/fertilizer is applied to a ground surface by seeding lines (outlets) 20. The seed bin 12 and fertilizer bin 14 deliver seed and fertilizer, respectively, by metering both products with metering devices 22. The metering devices 22 displace the seed/fertilizer products into the supply conduit 16 which acts as a corridor for seed and fertilizer to get carried to the head 18 which then evenly distributes the seed, fertilizer and air to the seeding lines 20. The seeding lines 20 guide the seed/fertilizer and air to openers 24 which then apply the seed/fertilizer to the soil. Air flow through the supply conduit 16 is controlled by operation of a fan 26 which may be operated at a range of fan speeds according to the air flow desired.

With reference to FIG. 3, the distributor head 18 includes a main head stem 28 which serves as an inlet of the distribution head 18, a plurality of seed outlets 30, and a head cap 32. Seed and fertilizer is carried with airflow from the supply conduit 16 through the head stem 28 to the distributor head 18 which, through the use of air, evenly divides the seed/fertilizer to the seed outlets 30. The head cap 32 is usually removable for inspection and cleaning of the distributor head 18, and is airtight to prevent escape of seed/fertilizer and/or air.

Traditionally, the above design of air seeder 10 works well, until farmers increase drill row spacing (by removing openers 24 for agronomic reasons) which also reduces the number of seeding lines 20. This reduction in the number of seeding lines 20 causes increased air velocity in the remaining seeding lines, and leads to an increase in the impact velocities of seed/fertilizer into the soil. This situation generally results in poor seeding depth due to the seeds "bouncing" from their intended furrow and onto the soil surface, causing poor seed germination and plant establishment.

Seed and fertilizer distribution can be measured in volume/hour (v/hr), which is ground speed dependent.

In one example, for an air seeder to meter 200 kg/Ha of product to a 9 m planter travelling at 10 kph (v/hr=1.8 mt/hr) requires air fan speed of around 3,600 rpm to move the product through to the ground. As the farmer wants to increase ground speed to 13 kph to plant more hectares in one day, fan revolutions per minute (which create more pressure) have to be increased as well to move the increased v/hr (which now becomes 2.34 mt/hr due to the ground speed increase). The increase in fan revolutions per minute results in an increase of air pressure which is released at the openers 24, causing seed bounce. If the farmer had increased ground speed without increasing fan revolutions per minute, the seed/fertilizer would build up in the supply conduit 16, rapidly leading to blockages (due to the increase in v/hr without an increase in airflow). Therefore, an increase in v/hr requires increased airflow and increased airflow results in seed bounce.

A similar situation occurs when a farmer decides to increase drill row spacing. For example, a farmer uses 250 mm rows for his planting, with a "good" seed and air relationship. A "good" relationship is the point where the least amount of air is required to carry seed/fertilizer into the openers 24 without build up or blockage in the supply conduit 16. The need to increase drill rows (for agronomic reasons ie. less soil disturbance) effectively requires reducing the number of outlets for both seed and air, causing an increase in airflow through the remaining openers 24, and therefore resulting in seed bounce. The simple remedy to reduce airflow would be to lower fan speed, but remembering that the air seeder still has the same v/hr requirement as it did on narrow rows, even with a reduction in fan speed blockages will still occur. In this situation, reducing the fan speed and lowering the v/hr (by reducing ground speed and productivity) is the only solution.

Figure 4:
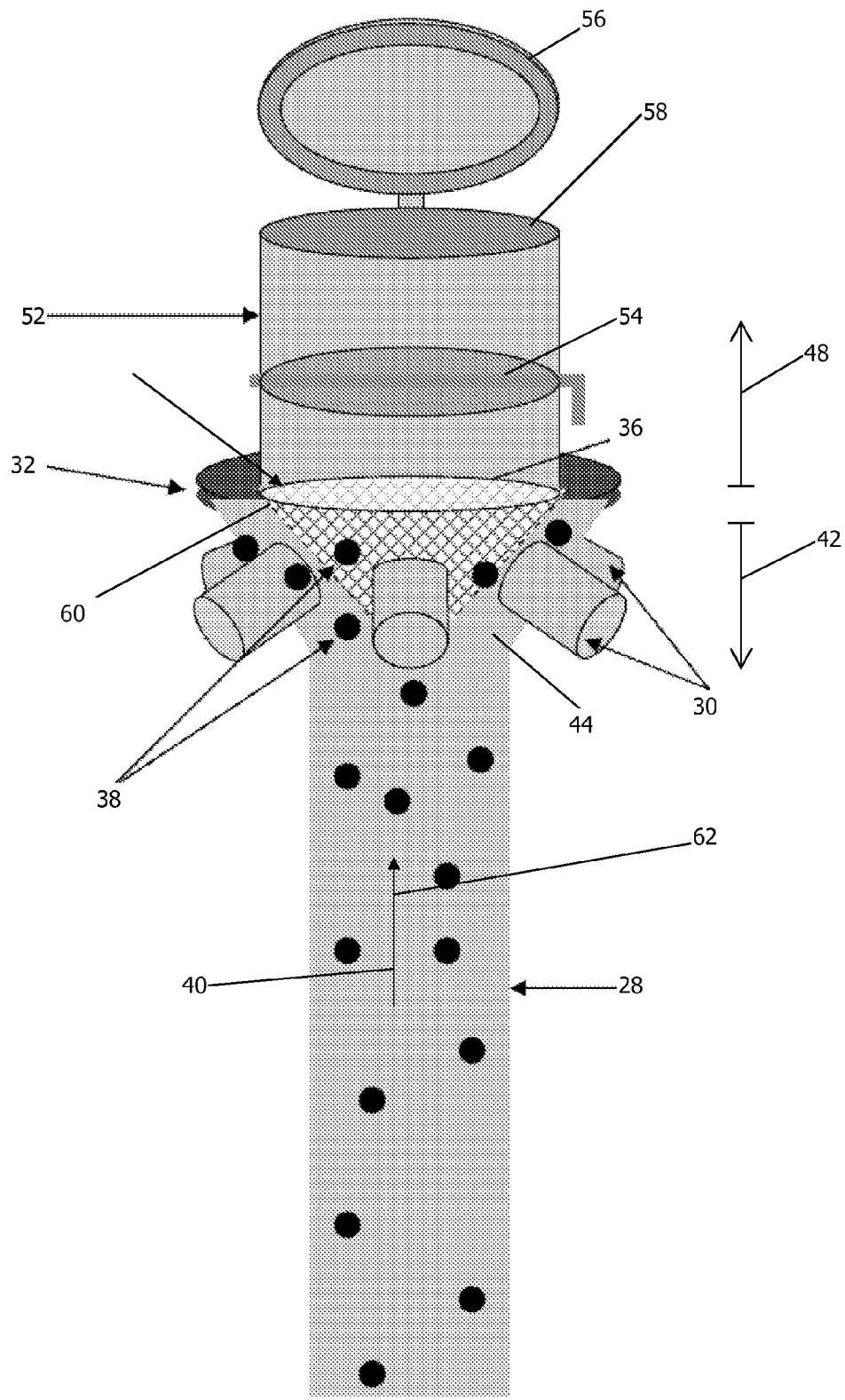
FIG. 4 is a diagrammatic side perspective view of an air seeder distributor head modified to incorporate a venting system in accordance with an example of the present invention.

Bearing this in mind, the applicant has developed an air seeder venting system 34, an example of which is shown with reference to FIGS. 4 and 5. The air seeder venting system 34 comprises a filter screen 36 which is mounted in the distribution head 18 of the air seeder 10, to separate seeds 38 and fertilizer from air 40 fed from the supply conduit 16. The filter screen 36 is located so as to have at an upstream side 42 an inlet 44 of the distribution head 18 in communication with the supply conduit 16 and a plurality of seed outlets 30 of the distribution head 18 in communication with the seeding lines 20. An air exhaust 46 is located at a downstream side 48 of the distribution head 18. The filter screen 36 is adapted such that, in use, air 40 from the inlet 44 passes through the filter screen 36 to the air exhaust 46, and the seeds 38 carried by the air 40 are arrested by the filter screen 36 and deflected by the filter screen 36 to fall by gravity through the plurality of seed outlets 30.

With reference to FIG. 4, so as to adapt the distributor head 18 of FIG. 3 for use with the venting system 34, an aperture 50 is formed in the head cap 32, and a cylinder 52 is placed above the head cap 32 with a lower end of the cylinder 52 in sealed relationship to the aperture 50 so as to form the air exhaust 46 at an upper end of the cylinder 52. The cylinder 52 has mounted therein an adjustable valve 54 in the form of a butterfly valve to adjust airflow through the air exhaust 46. The exhaust 46 also has a cap cover 56 which moves outwardly from a tip 58 of the exhaust 46 to an open condition (as shown in FIG. 4) in response to airflow through the exhaust 46, and returns to a closed condition against the tip 58 of the exhaust 46 in the absence of airflow through the exhaust 46.

The filter screen 36 has a surface 60 at an oblique angle relative to a direction (represented by arrow 62) of air passing through the filter screen 36 such that the seeds 38 are encouraged away from a centre of the air passage. In the particular example shown, this is achieved by forming the filter screen 36 in a conical shape, and by mounting the filter screen 36 in the distribution head 18 such that the conical shape is tapered outwardly in the direction 62 of air passage. The filter screen 36 is made of mesh to allow air to pass through the filter screen 36, but with apertures sufficiently small to prevent passage of seeds 38 and/or fertilizer. In this way, as the air passes substantially vertically upwardly through the distributor head 18, the seeds 38 and/or fertilizer are arrested by the filter screen 36, and fall under gravity through the seed outlets 30, and through the associated seeding lines 20 and openers 24 to the ground, reducing or eliminating seed bounce. As the seed outlets 30 are radially spaced about the distributor head 18, due to the symmetry of the distributor head 18 and the conical shaping of the filter screen 36, seeds 38 and/or fertilizer are evenly distributed between the seed outlets 30.

Advantageously, the air seeder venting system 34 releases as much or as little air as the operator wants from the air seeder distributor head 18, allowing seed/fertilizer to fall down the seeding lines 20 into a furrow in the ground, as intended, with or without air assistance (as determined by operation of the butterfly valve 54). Air is released through the mesh filter screen 36 while the seed 38 and fertilizer (which cannot pass through the mesh) simply flows out the seeding lines 20. Nothing sticks to the conical filter screen 36 due to its steep angle, which air-forced seed/fertilizer just rolls up and off. The conical shaping of the filter screen 36 has approximately the same angle as the distributor head 18 it is inserted into, with enough space between the head and the cone to allow any large seeds to pass. The conical shaping is beneficial as it allows upwards thrusted seed to roll up and off the mesh cone separating the air from seed (rather than seed being pinned to a flat mesh surface by air force).

Also advantageously with the present air seeder venting system, the operator can see the raised cap cover 56 from the driving vehicle (eg. tractor), indicating that air is being expelled through the air exhaust 46. If there is a blockage in the supply conduit 16, then air is slowed or stopped in that line, causing the cap cover 56 to fall shut instantly. Farmers presently pay large amounts for electronic head sensors which activate alarms when they detect no product movement in the distributor head 18, and, unfortunately, the sensors do malfunction and are known to cause false alarms. With the present air seeder venting system, the operator has a fail-safe head monitor which works on a simple foolproof system: exhaust cap cover down=no air through the air exhaust 46=blockage in the supply conduit 16.

Accordingly, the air seeder venting system doubles up as an adjustable diffuser and head monitor, for a fraction of the cost of the current alternatives. By releasing most of the air at the distributor head 18, this also reduces the amount of friction and back pressure caused by the seeding lines 20. Back pressure can occur when there are not enough openers 24 to exhaust the airflow being produced by the fan 26, and this creates a turbulent environment in the supply conduit 16 which in severe cases can suspend product flow in the supply conduit 16 and lead to erratic product delivery leading to blockages. While common market diffusers separate the seed/fertilizer from the air near the openers 24, they do not increase the size or amount of outlets 24 for the excess air to escape, so in wide row seed formations, back pressure in the supply conduit 16 can still occur.

Also advantageously, examples of the air seeder venting system of the present invention may be adapted to different machine types. Because most air seeders work in the same way, the venting system may be easily fitted to many makes of air seeder head by simply cutting and inserting the apparatus into the air seeder head cap.

While an example of the present invention has been described above, it should be understood that it has been presented by way of example only, and not by way of limitation. It will be apparent to a person skilled in the relevant art that various changes in form and detail can be made therein without departing from the spirit and scope of the invention. Thus, the present invention should not be limited by the above described example.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

What is claimed is:

1. An air seeder venting system comprising a filter screen mounted in a distribution head of an air seeder for separating seeds from air fed from a supply conduit, the distribution head having an inlet in communication with the supply conduit, a plurality of seed outlets in communication with seeding lines, and an air exhaust, wherein the filter screen is located so as to have at an upstream side the inlet and the plurality of seed outlets, and at a downstream side the air exhaust.

2. An air seeder venting system as claimed in claim 1, wherein the filter screen is adapted such that in use air from the inlet passes through the filter screen to the air exhaust, and seeds carried by the air are arrested by the filter screen and deflected by the filter screen to fall by gravity through the plurality of seed outlets.

3. An air seeder venting system as claimed in claim 2, wherein a surface of the filter screen is at an oblique angle relative to a direction of air passing through the filter screen such that the seeds are diverted away from a centre of the air passage.

4. An air seeder venting system as claimed in claim 3, wherein the filter screen is conical, and is mounted in the distribution head to be tapered outwardly in the direction of air passage.

5. An air seeder venting system as claimed in claim 4, wherein the filter screen is made of mesh.

6. An air seeder venting system as claimed in claim 1, including an adjustable valve downstream of the filter screen for adjusting airflow through the air exhaust.

7. An air seeder venting system as claimed in claim 6, wherein the valve is a butterfly valve.

8. An air seeder venting system as claimed in claim 1, wherein the air exhaust has a cap cover which moves outwardly from an outlet of the air exhaust to an open condition in response to airflow through the air exhaust, and returns to a closed condition against the outlet of the air exhaust in the absence of airflow through the air exhaust.

9. An air seeder venting system as claimed in claim 1, wherein in use the supply conduit feeds seed and fertilizer from an air seeder bin, at elevated air pressure, and the fertilizer carried by the air is arrested by the filter screen and deflected by the filter screen to fall by gravity through the plurality of seed outlets.

10. An air seeder venting system as claimed in claim 1, wherein air passes upwardly through the distributor head.

11. An air seeder venting system as claimed in claim 1, wherein the plurality of seed outlets are spaced radially about the distributor head.

12. An air seeder venting system as claimed in claim 1, wherein the filter screen is made of mesh.

13. An air seeder venting system as claimed in claim 2, including an adjustable valve downstream of the filter screen for adjusting airflow through the air exhaust.

14. An air seeder venting system as claimed in claim 6, wherein the air exhaust has a cap cover which moves outwardly from an outlet of the air exhaust to an open condition in response to airflow through the air exhaust, and returns to a closed condition against the outlet of the air exhaust in the absence of airflow through the air exhaust.

15. An air seeder venting system as claimed in claim 2, wherein in use the supply conduit feeds seed and fertilizer from an air seeder bin, at elevated air pressure, and the fertilizer carried by the air is arrested by the filter screen and deflected by the filter screen to fall by gravity through the plurality of seed outlets.

16. An air seeder venting system as claimed in claim 15, wherein air passes upwardly through the distributor head.

17. An air seeder venting system as claimed in claim 2, wherein the plurality of seed outlets are spaced radially about the distributor head.

18. An air seeder venting system as claimed in claim 3, further including an adjustable valve downstream of the filter screen for adjusting airflow through the air exhaust, wherein in use the supply conduit feeds seed and fertilizer from an air seeder bin, at elevated air pressure, and the fertilizer carried by the air is arrested by the filter screen and deflected by the filter screen to fall by gravity through the plurality of seed outlets and wherein the plurality of seed outlets are spaced radially about the distributor head.

\* \* \* \* \*